(12) United States Patent
Falkowski et al.

(10) Patent No.: US 7,279,927 B2
(45) Date of Patent: Oct. 9, 2007

(54) INTEGRATED CIRCUIT WITH MULTIPLE POWER DOMAINS

(75) Inventors: John Thomas Falkowski, White Haven, PA (US); Bruce Godley Littlefield, Oley, PA (US); Douglas D. Lopata, Boyertown, PA (US); Hussein K. Mecklai, Breinigsville, PA (US); Stanley Reinhold, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 186 days.

(21) Appl. No.: 11/052,636

(22) Filed: Feb. 7, 2005

(65) Prior Publication Data

US 2005/0253462 A1    Nov. 17, 2005

Related U.S. Application Data

(60) Provisional application No. 60/542,609, filed on Feb. 6, 2004.

(51) Int. Cl.
*H03K 17/16* (2006.01)
*H03K 19/003* (2006.01)

(52) U.S. Cl. .......................... 326/33; 326/112; 326/119

(58) Field of Classification Search ................. 326/33, 326/112, 119, 121
See application file for complete search history.

(56) References Cited

U.S. PATENT DOCUMENTS 5,675,808 A    10/1997  Gulick et al.
6,515,513 B2    2/2003  Ye et al.
6,744,301 B1    6/2004  Tschanz et al.
6,765,414 B2    7/2004  Keshavarzi et al.
6,882,175 B2 *  4/2005  Motegi et al. ................ 326/31

OTHER PUBLICATIONS

Press Release for Feb. 16, 2004—"Agere Systems Announces Breakthrough Chip Set and Software Architecture for Smartphones and Multimedia Wireless Handsets", pp. 1-4.
Associated Press Article (retrieved from the internet—Aug. 31, 2004) by Matthew Fordahl, AP Technology Writer—"Intel Announces Chip Shrinking Milestone" pp. 1-2.

* cited by examiner

*Primary Examiner*—Anh Q. Tran

(57) ABSTRACT

An integrated circuit having two or more power domains that include load circuits in different portions of the integrated circuit is disclosed. In order to conserve power, the circuits in one of the power domains are shut down by disconnecting the power source serving that domain. The load circuits in each power domain are buffered from the load circuits in other power domains by buffer cells. The buffer cells reduce leakage currents in the power domain that is shut down, by restricting data signals from the "live" power domain from reaching the shut-down power domain, and further by providing predetermined voltage signals to the load circuits in the shut-down power domain that are selected to minimize leakage currents in the inactive load circuits. The invention further provides a corresponding method for reducing power consumption in an integrated circuit having at least two power domains separated by a buffer cell.

12 Claims, 2 Drawing Sheets

INTEGRATED CIRCUIT WITH MULTIPLE POWER DOMAINS

CROSS-REFERENCES

This application claims the benefit under 35 U.S.C. § 119(e) of provisional application No. 60/542,609 filed Feb. 6, 2004, which is fully incorporated herein by reference.

FIELD OF THE INVENTION

The present invention relates generally to power control and reduction of leakage currents in an integrated circuit.

BACKGROUND OF THE INVENTION

Ever increasing performance demands are being placed on computer circuits, microprocessors, application specific integrated circuits (ASICs) and other ICs and VLSICs. ASICs, ICs and VLSICs are being required to operate at continually increasing clock speeds to perform more operations in a shorter period of time. To provide these faster operating speeds, circuits and processes are being designed with increasingly smaller geometries and with lower threshold voltages. With these smaller geometries and lower threshold voltages, the flow of leakage current from a system power supply to a circuit supplied by the system power supply tends to increase. In the aggregate, such leakage currents can result in a significant amount of power consumption in a circuit. This can be critical in mobile, battery powered electronic devices, such as cellular telephones, mobile radios, laptop computers and handheld computing devices and the like, where the ability to operate for extended periods of time on battery power is of primary importance to users.

FIG. 1 depicts a known arrangement for reducing leakage current and power consumption in a circuit through the use of sleep transistors located between the system power supply and a given memory module on an integrated circuit. This arrangement is described, e.g., in U.S. Pat. No. 6,515,513 to Ye et al., U.S. Pat. No. 6,744,301 to Tchanz et al., and U.S. Pat. No. 6,754,414 to Keshavarzi et al. With reference to FIG. 1, when the sleep transistors Q1 and Q2 are active or turned on, the system power supply provides current to the circuit through the sleep transistors. When sleep transistors Q1 and Q2 are idle or turned off, the intent is that no current is supplied to the circuit. Nonetheless, some leakage current still tends to flow through the sleep transistors, depending upon the characteristics of the sleep transistors and the circuit or load. Because even these leakage currents constitute an ongoing power loss that tends to deplete a device's batteries, it would be highly desirable to provide an integrated circuit with improved leakage current characteristics.

SUMMARY OF THE INVENTION

Briefly described, the invention is an integrated circuit having two or more power domains that include load circuits in different portions of the integrated circuit. In order to conserve power, the circuits in one of the power domains are shut down by disconnecting the power source serving that domain. In addition, in accordance with the invention, the load circuits in each power domain are buffered from the load circuits in other power domains by buffer cells. The buffer cells reduce leakage currents in the power domain that is shut down, by restricting data signals from a "live" power domain from reaching the shut-down power domain, and preferably also by providing predetermined voltage signals to the load circuits in the shut-down power domain that are selected to minimize leakage currents in the inactive load circuits. Preferably, the buffer cells are switches, or more preferably logic gates (e.g., AND, OR, NAND, NOR, XOR), that pass data signals between active power domains but provide constant output signals to a power domain whose power source is disconnected.

Thus, the invention may broadly be described as a circuit having multiple power consumption modes, comprising: a main power domain located on a first portion of an integrated circuit and having one or more terminals capable of outputting data signals; a first switched power domain located on a second portion of the integrated circuit and having one or more terminals capable of receiving data signals; a first controllable power supply capable of providing a first supply voltage to the first switched power domain; and a first buffer cell connected between the one or more terminals of the main power domain and the one or more input terminals of the first switched power domain, and including a control terminal capable of receiving a first buffer control signal; wherein responsive to the first buffer control signal, the first buffer cell either (a) passes data signals from the main power domain to the first switched power domain or (b) restricts data signals from the main power domain from reaching the first switched power domain, thereby reducing leakage currents in the first switched power domain caused by the data signals.

The invention further provides a method for reducing power consumption in an integrated circuit having a main power domain on a first portion of the integrated circuit and a first switched power domain on a second portion of the integrated circuit, separated by at least a first buffer cell, the method comprising the steps of: receiving, at the first buffer cell, a first set of one or more data signals from the main power domain; receiving, at the first buffer cell, a first buffer control signal; in response to the first buffer control signal, either (a) passing the first set of one or more data signals to the first switched power domain or (b) restricting the first set of one or more data signals from reaching the first switched power domain; receiving a first power-down control signal; and disconnecting the first switched power domain from a power supply in response to the first power-down control signal.

BRIEF DESCRIPTION OF THE DRAWINGS

Various embodiments of the present invention will now be described in detail in conjunction with the annexed drawings, in which.

DETAILED DESCRIPTION

As described in the Background above, past approaches to power management in integrated circuits have centered around the use of sleep transistors that shut off the power supply for a given load circuit. The present inventors have recognized that even where sleep transistors are used in this fashion, significant leakage currents may still flow in the load circuit as a result of the data signals that may be present at the input terminals of the load circuit. The invention solves this problem by inserting a buffer cell that transparently passes data signals to the load circuit when the power to the circuit is "on" (not disconnected by the sleep transistor) but prevents data signals from reaching the load circuit when the power to the load circuit is "off."

Figure 1:
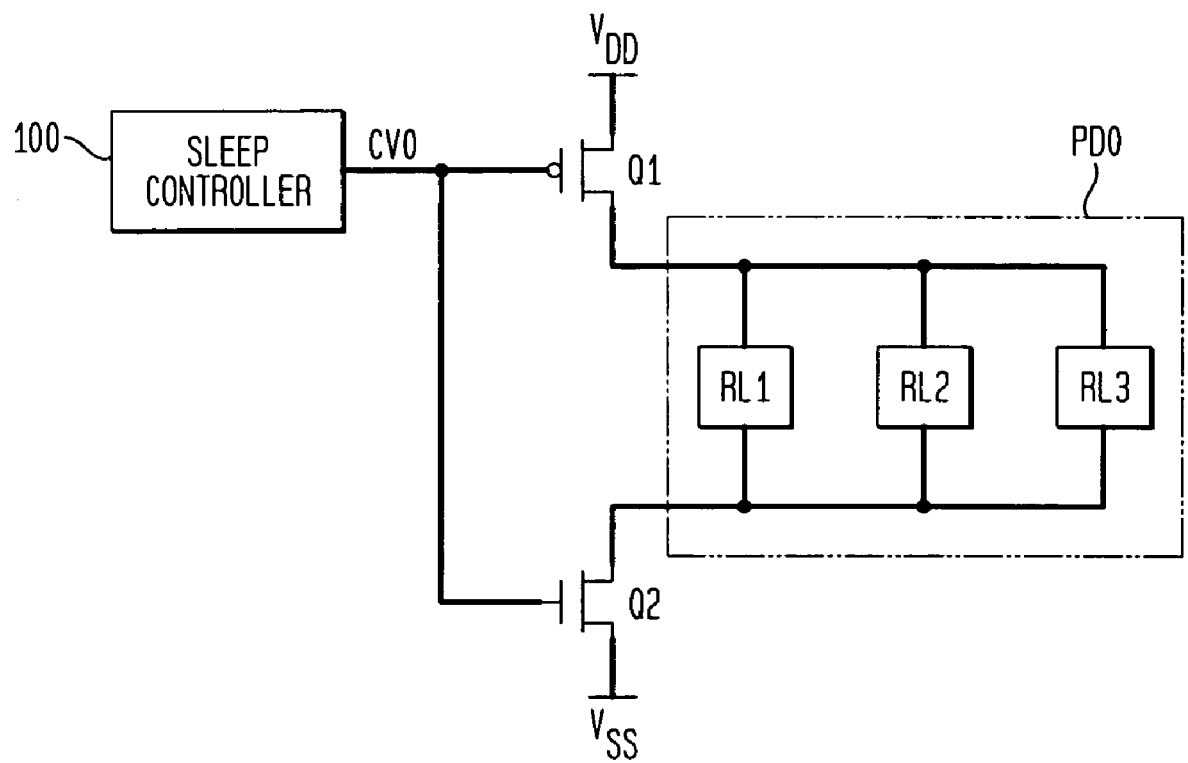
FIG. 1 is a circuit diagram of an integrated circuit having sleep transistors as described in the prior art.
Figure 2:
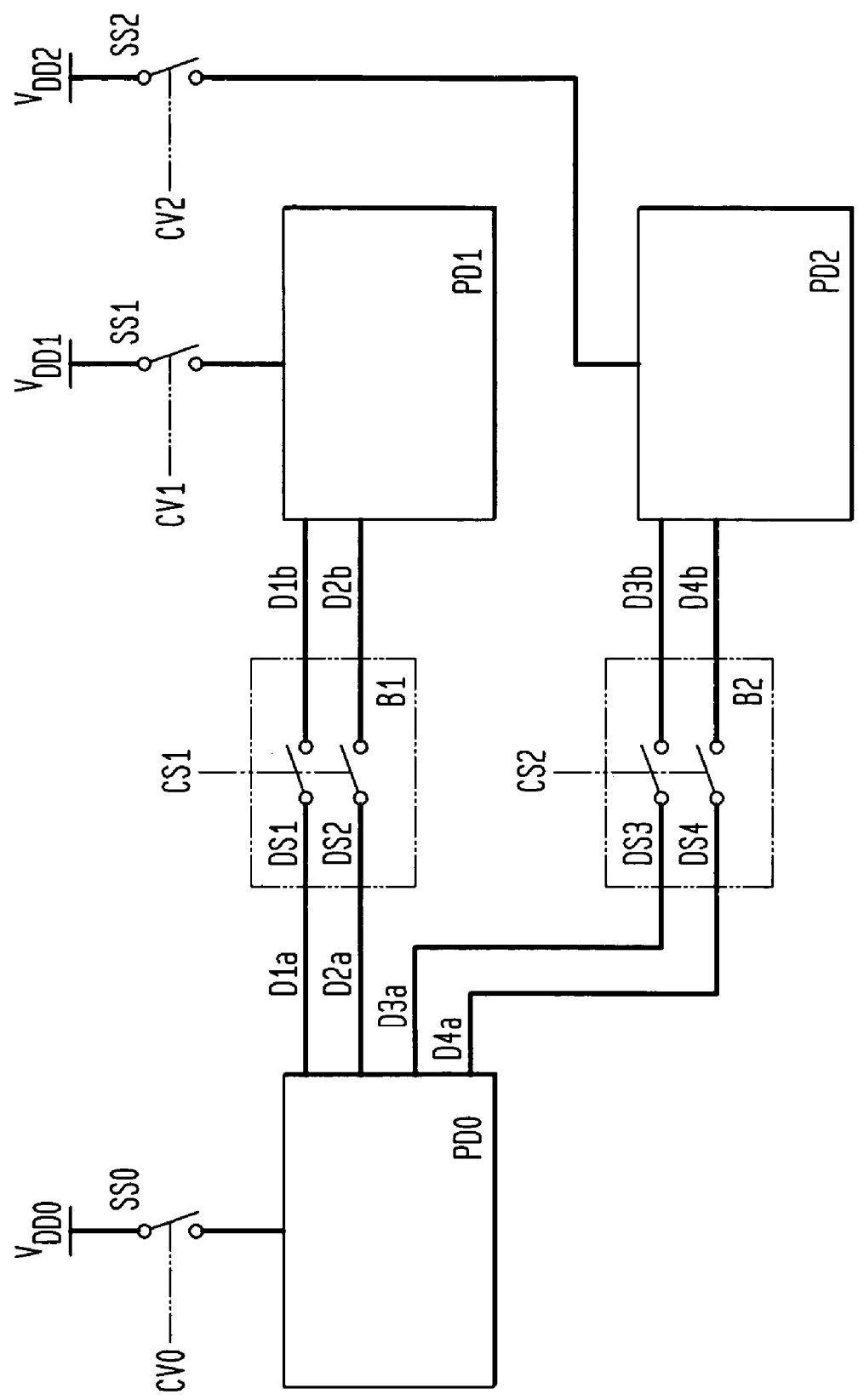
FIG. 2 is a circuit diagram of an integrated circuit having power domains in accordance with the present invention.

An integrated circuit in accordance with the present invention is shown in FIG. 2. The circuit comprises two or more power domains PD0, PD1, PD2 that include one or more load circuits (not shown). The load circuits in power domain PD0 are connected to a first buffer cell B1 by a first set of leads D1$a$ and D2$a$ and to a second buffer cell B2 by a second set of leads D3$a$ and D4$a$. B1 in turn is connected to the load circuits in power domain PD1 by leads D1$b$ and D2$b$, while B2 is connected to the load circuits in power domain PD2 by leads D3$b$ and D4$b$.

Further, each power domain PD0, PD1, PD2 is connected to a controllable power supply for controllably providing a supply voltage to the load circuits in the respective power domain. In FIG. 2, the controllable power supply are depicted as supply voltages VDD0-VDD2 connected to the respective power domains PD0-PD2 through switches SS0-SS2. Switches SS0-SS2 are preferably low-loss transistors of a type used in the art for power control. Switches SS0-SS2 are preferably controlled by voltage control signals CV0-CV2. Alternatively, the controllable power supply may be any power supply (including, e.g., a low-drop-out regulator or a switched-mode power supply) having an output voltage that may be turned on and off by control signals CV0-CV2. As such, switches SS0-SS2 would not be required, and voltage control signals CV0-CV2 could be input directly to the respective power supply. As used herein, therefore, "disconnecting" a supply voltage is to be understood as including either (a) turning off the power supply and (b) turning off a switch connected to the power supply.

Buffer cells B1, B2 include switches DS1-DS4 that interrupt the flow of data signals between power domain PD0 and power domains PD1 and PD2 in response to buffer control signals CS1 and CS2. Switches DS1-DS4 may be simple transistor switches (FETs, BJTs, etc.) or may be more complex logic circuits (e.g., AND, NAND, OR, NOR, or XOR logic gates) having CS1 or CS2 respectively as one of the logical inputs and a data signal from power domain PD0 as the other logical input.

Preferably, a power controller (not shown) is further provided in order to produce voltage control signals CV0-CV2 and buffer control signals CS1-CS2. The power controller is preferably a microprocessor but may be a logic circuit such as an ASIC. The power controller may be either contained on the same integrated circuit as power domains PD0-PD2 or on a separate integrated circuit altogether. Preferably, control signals CV0-CV2 and CS1-CS2 are binary signals in which a given binary state (e.g., "0" or "1") causes switches DS1-DS4 and SS0-SS2 to open while the opposite binary state (e.g., "1" or "0", respectively) causes the switches to close.

The integrated circuit described above is capable of operating in four distinct power consumption modes. The first mode is a full-power mode. In this mode, suitable voltage control signals CV0-CV2 are provided in order to close switches SS0-SS2, thereby allowing power to flow to the load circuits in each power domain PD0, PD1, PD2. Further, suitable buffer control signals CS1, CS2 are provided in order to close switches DS1-DS4, so that data signals generated by the load circuits in PD0 are received by buffer cells B1 and B2 and then passed to the circuits in power domains PD1 and PD2. Similarly, data signals generated by the load circuits in PD0 will be received by buffer cells B1 and B2 and passed to the circuits in power domains PD1 and PD2.

The second mode of operation is a medium-power mode. In this mode, the circuits in power domain PD0, as well as those in only one of the other power domains (PD1 or PD2), remain active. The circuits in the remaining power domain are powered-down and isolated from incoming signals by the respective buffer cell. More specifically, if power domain PD1 is to be powered down, a suitable buffer control signal CS1 is provided to buffer cell B1 such that switches DS1 and DS2 are caused to open. Buffer cell B1 thus isolates the circuits in power domain PD1 from the circuits in power domain PD0 and prevents data signals from power domain PD0 from reaching power domain PD1 (and vice versa). Further, a suitable voltage control signal CV1 is provided to the controllable power supply (shown here as supply voltage VDD1 and switch SS1) that supplies current to the circuits in power domain PD1, causing the controllable power supply to cease supplying current to those circuits (as by the opening of switch SS1). As a result, the overall power consumption in the integrated circuit is greatly reduced, because (a) the "active" power is reduced by turning off the load circuits in the isolated power domain, and (b) the "passive" leakage currents in the load circuits that otherwise would be caused by data signals or voltages in the other "live" power domains are reduced or eliminated altogether. It should be noted that although the order of switching the buffer cell (B1 or B2) and the power supply switch (SS1 or SS2) is not critical, it is preferable that the buffer cell be switched at a time interval T before the power supply switch is caused to open, in order to protect the load circuits in power domain PD0 from electrical transients that may arise during power-down of domain PD1 or PD2.

The third mode of operation is a low-power mode in which the circuits in both power domains PD1 and PD2 are powered down and buffered in a similar manner as in the second mode above. In this low-power mode, both buffer cells B1 and B2 are provided with suitable buffer control signals CS1 and CS2 such that all switches DS1-DS4 are caused to open. Similarly, the controllable power supply are provided with suitable control signals CV1 and CV2 such that power is no longer provided to the circuits in power domains PD1 and PD2.

Finally, in the fourth mode of operation, all of the power domains PD0, PD1 and PD2 may be powered down, by the application of suitable supply control signals. It will be recognized, however, that this fourth mode of operation may or may not be needed, depending on the desired functionality of the load circuits in power domains PD0-PD2. For example, it may be desirable for the load circuits in power domain PD0 to contain circuits that remain active even when a device is in a power-save mode. Such circuits may include, e.g., a watchdog or timer circuit, a clock circuit, or a communication circuit in a wireless device such as a cellular telephone. As such, power domain PD0 is referred to herein as a "main" power domain, which may be either switched or unswitched according to the needs of a given integrated circuit, while power domains PD1 and PD2 are referred to herein as "switched" power domains, which are may be powered down by providing a suitable voltage control signal to their respective controllable power supply.

In a further embodiment, leakage currents in a powered-down power domain may be still further reduced by providing predetermined voltages to each inactive load circuit in the powered-down domain (e.g., in place of the data signals blocked by the buffer cell). In this embodiment, buffer cells B1, B2 are preferably SPDT (single-pole, double-throw) switches having at least two possible positions, as determined by buffer control signals CS1, CS2. In the first position, the switch transparently passes data signals from power domain PD0 to the respective power domain PD1, PD2. This switch position is preferably used while a given power domain is active or powered-up. In the second position, preferably used while the power domain is powered-down, the switch passes a predetermined voltage from a suitable voltage source (e.g., VDD1) to the load circuits in the respective power domain.

Advantageously, the predetermined voltages provided to the circuits in a powered-down power domain may be customized for each load circuit in the power domain. For example, if the load circuit is an NPN transistor, the predetermined voltage may be a zero voltage, so that the transistor is biased "off." Alternatively, if the load circuit is a PNP transistor, the predetermined voltage may be VDD0, such that the PNP transistor similarly is biased "off."

In a further embodiment, buffer cells B1 and B2 may be implemented as SPDT switches by using transistor logic circuits, selected to provide an output based upon the respective values of the buffer control signals CS1 and CS2 and the data signals output on leads D1a-D4a. For example, a simple AND gate may be used, such that binary ("high" and "low") data signals pass through the AND gate when the respective buffer control signal is "high," whereas a "low" voltage level is provided to the downstream load circuit when the respective buffer control signal is "low." Alternatively, if a "high" voltage level is needed to minimize leakage current in a given powered-down load circuit, an OR gate may be used, which passes data signals when the buffer control signal is "low" (i.e., "data_enable") but provides a constant "high" voltage level when the buffer control signal is "high" (i.e., "data_block"). It will be recognized that other types of logic circuits may be used (e.g., NAND, NOR, and XOR gates, latches or bistable multivibrators), provided that the circuit passes data signals for a given buffer control signal.

There has thus been described an integrated circuit having multiple modes of power consumption and having improved leakage current characteristics. It will be understood, however, that the foregoing description of the invention is by way of example only, and variations will be evident to those skilled in the art without departing from the scope of the invention, which is as set out in the appended claims.

What is claimed is:

1. A method for reducing power consumption in an integrated circuit having a main power domain on a first portion of the integrated circuit and a first switched power domain on a second portion of the integrated circuit, separated by at least a first buffer cell, the method comprising the steps of:
    receiving, at the first buffer cell, a first set of one or more data signals from the main power domain;
    receiving, at the first buffer cell, a first buffer control signal;
    in response to the first buffer control signal, either (a) passing the first set of one or more data signals to the first switched power domain or (b) restricting the first set of one or more data signals from reaching the first switched power domain;
    receiving a first power-down control signal; and
    disconnecting the first switched power domain from a power supply in response to the first power-down control signals;
    wherein the step of disconnecting the first switched power domain from a power supply is performed a predetermined time interval after the step of receiving the first buffer control signal.

2. The method of claim 1, further comprising the step of providing a first set of one or more predetermined voltages to the first switched power domain.

3. The method of claim 1, wherein the step of passing the first set of data signals to the first switched power domain comprises the step of:
    performing a logical operation of the first buffer control signal with each of the first set of one or more data signals from the main power domain.

4. The method of claim 3, wherein the logical operation is one of an AND operation, an OR operation, a NAND operation, a NOR operation and an XOR operation.

5. The method of claim 1, wherein the integrated circuit further includes a second switched power domain on a third portion of the integrated circuit, separated from the main power domain by a second buffer cell, the method further comprising the steps of:
    receiving, at the second buffer cell, a second set of one or more data signals from the main power domain;
    receiving, at the second buffer cell, a second buffer control signal;
    in response to the second buffer control signal, either (a) passing the second set of one or more data signals to the first switched power domain or (b) restricting the second set of one or more data signals from reaching the second switched power domain;
    receiving a second power-down control signal; and
    disconnecting the second switched power domain from a supply voltage in response to the second power-down control signal.

6. A circuit having multiple power consumption modes, comprising:
    a main power domain located on a first portion of an integrated circuit and having a plurality of terminals capable of outputting data signals,
    wherein the main power domain comprises a first plurality of load circuits, each connected respectively to one of the plurality of terminals of the main power domain;
    a first switched power domain located on a second portion of the integrated circuit and having a plurality of terminals capable of receiving data signals, wherein the first switched power domain comprises a second plurality of load circuits, each connected respectively to one of the plurality of terminals of the first switched power domain;
    a first controllable power supply capable of providing a first supply voltage to the first switched power domain; and
    a first buffer cell connected between the one or more terminals of the main power domain and the one or more input terminals of the first switched power domain, and including a control terminal capable of receiving a first buffer control signal, wherein the first buffer cell comprises a plurality of switches connected respectively between the plurality of terminals of the main power domain and the plurality of terminals of the first switched power domain;
    wherein responsive to the first buffer control signal, the first buffer cell either (a) passes data signals from the main power domain to the first switched power domain or (b) restricts data signals from the main power domain from reaching the first switched power domain, thereby reducing leakage currents in the first switched power domain caused by the data signals.

7. The circuit of claim 6, further comprising
a power controller connected to the control terminal of the first buffer cell and capable of producing the first buffer control signal.

8. The circuit of claim 7, wherein the power controller further produces a supply control signal that causes the first controllable power supply either to provide or not to provide the first supply voltage to the first switched power domain.

9. The circuit of claim 8, wherein the first buffer control signal from the power controller causes the first buffer cell to restrict data signals from the main power domain from reaching the first switched power domain approximately when the first controllable power supply provides no supply voltage to the first switched power domain.

10. The circuit of claim 6, wherein the first buffer cell comprises at least one of a switch, a logic gate, an AND gate, a NAND gate, a NOR gate, an XOR gate, a latch and a bistable multivibrator.

11. The circuit of claim 6, wherein the first controllable power supply comprises one of (a) a low-drop-out regulator having a control circuit that turns the regulator on and off, (b) a power supply having a control circuit that turns the power supply on and off, and (c) a power supply whose output is connected through a control switch.

12. The circuit of claim 6, further comprising:
a second switched power domain located on a third portion of the integrated circuit and having one or more terminals capable of receiving data signals;

a second controllable power supply for controllably providing a second supply voltage to the second switched power domain; and a second buffer cell, connected between the one or more terminals of the main power domain and the one or more terminals of the second switched power domain, and including a control terminal capable of receiving a second buffer control signal;

wherein responsive to the second buffer control signal, the second buffer cell either (a) passes the data signals from the main power domain to the second switched power domain or (b) prevents the data signals from the main power domain from reaching the second switched power domain, thereby reducing leakage currents in the second switched power domain caused by the data signals.

* * * * *